United States Patent
McCaffrey et al.

(10) Patent No.: US 9,447,696 B2
(45) Date of Patent: Sep. 20, 2016

(54) BLADE OUTER AIR SEAL SYSTEM FOR CONTROLLED TIP CLEARANCE

(71) Applicants: Michael G. McCaffrey, Windsor, CT (US); Brandon T. Rouse, Anacortes, WA (US); Thomas Almy, Rocky Hill, CT (US); Igor S. Garcia, Salem, CT (US); John R. Farris, Bolton, CT (US); Mark Borja, Palm Beach Gardens, FL (US)

(72) Inventors: Michael G. McCaffrey, Windsor, CT (US); Brandon T. Rouse, Anacortes, WA (US); Thomas Almy, Rocky Hill, CT (US); Igor S. Garcia, Salem, CT (US); John R. Farris, Bolton, CT (US); Mark Borja, Palm Beach Gardens, FL (US)

(73) Assignee: United Technologies Corporation, Hartford, CT (US)

(*) Notice: Subject to any disclaimer, the term of this patent is extended or adjusted under 35 U.S.C. 154(b) by 814 days.

(21) Appl. No.: 13/727,798

(22) Filed: Dec. 27, 2012

(65) Prior Publication Data

US 2014/0186152 A1    Jul. 3, 2014

(51) Int. Cl.
*F01D 11/18*   (2006.01)

(52) U.S. Cl.
CPC .......... *F01D 11/18* (2013.01); *F05D 2240/11* (2013.01); *F05D 2300/50212* (2013.01); *Y02T 50/671* (2013.01)

(58) Field of Classification Search
CPC ........ F01D 11/18; F01D 11/12; F01D 11/16; F05D 2300/50212; F05D 2240/11
See application file for complete search history.

(56) References Cited

U.S. PATENT DOCUMENTS

| | | | | |
|---|---|---|---|---|
| 4,131,388 A | * | 12/1978 | Brodell | F01D 11/18 415/127 |
| 4,317,646 A | * | 3/1982 | Steel | F01D 11/18 415/116 |
| 4,522,559 A | | 6/1985 | Burge | |
| 5,062,767 A | * | 11/1991 | Worley | F01D 9/042 415/190 |
| 5,092,737 A | | 3/1992 | Lau | |
| 6,142,731 A | * | 11/2000 | Dewis | F01D 11/08 277/416 |

(Continued)

FOREIGN PATENT DOCUMENTS

EP    2518274    10/2012

OTHER PUBLICATIONS

U.S. Appl. No. 13/095,326, filed Apr. 27, 2011, Entitled Blade Clearance Control Using High-CTE and Low-CTE Ring Members.

(Continued)

*Primary Examiner* — Richard Edgar
*Assistant Examiner* — Eldon Brockman
(74) *Attorney, Agent, or Firm* — Carlson, Gaskey & Olds, P.C.

(57) ABSTRACT

A blade outer air seal system for a gas turbine engine includes a plurality of ring carriers made of a first material having a first coefficient of thermal expansion. A plurality of seal segments are carried, respectively, on the plurality of ring carriers. A ring member is carried in the plurality of ring carriers. The ring member is made of a second material that is different from the first material in composition. The second material has a second coefficient of thermal expansion such that the first coefficient of thermal expansion is 75-175% of the second coefficient of thermal expansion.

20 Claims, 3 Drawing Sheets

(56) References Cited

U.S. PATENT DOCUMENTS

| | | | |
|---|---|---|---|
| 6,272,422 B2 | 8/2001 | Khalid et al. | |
| 6,382,905 B1 | 5/2002 | Czachor et al. | |
| 6,487,491 B1 | 11/2002 | Karpman et al. | |
| 6,733,233 B2 | 5/2004 | Jasklowski et al. | |
| 6,758,653 B2 * | 7/2004 | Morrison | F01D 9/04 415/116 |
| 6,877,952 B2 | 4/2005 | Wilson | |
| 7,407,369 B2 | 8/2008 | Schwarz et al. | |
| 7,534,086 B2 * | 5/2009 | Mazzola | F01D 11/08 415/173.1 |
| 7,665,960 B2 | 2/2010 | Shi et al. | |
| 8,011,883 B2 | 9/2011 | Schwarz et al. | |
| 8,092,160 B2 | 1/2012 | Shi et al. | |
| 8,790,067 B2 * | 7/2014 | McCaffrey | F01D 11/18 415/1 |
| 2003/0049121 A1 | 3/2003 | Dierksmeier et al. | |
| 2003/0170115 A1 | 9/2003 | Bowen et al. | |
| 2004/0071548 A1 | 4/2004 | Wilson | |
| 2009/0208322 A1 | 8/2009 | McCaffrey | |
| 2010/0104433 A1 | 4/2010 | Shi et al. | |
| 2010/0226760 A1 | 9/2010 | McCaffrey | |
| 2011/0236179 A1 | 9/2011 | Rog et al. | |
| 2012/0275898 A1 * | 11/2012 | McCaffrey | F01D 11/18 415/1 |

OTHER PUBLICATIONS

International Search Report and Written Opinion for PCT Application No. PCT/US2013/075273, mailed Sep. 25, 2014.

European Search Report for European Patent Application No. 13876286 completed Apr. 15, 2016.

International Preliminary Report on Patentability for PCT Application No. PCT/US2013/075273, mailed Jul. 9, 2015.

* cited by examiner

BLADE OUTER AIR SEAL SYSTEM FOR CONTROLLED TIP CLEARANCE

STATEMENT REGARDING FEDERALLY SPONSORED RESEARCH OR DEVELOPMENT

This invention was made with government support under contract number N-00019-12-D-0002 awarded by Department of the Navy. The government has certain rights in the invention.

BACKGROUND

This disclosure relates to blade tip clearance in gas turbine engines and, more particularly, to passive tip clearance control.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The turbine section can include a blade outer air seal system that provides a desirably minimal clearance between tips of the blades of the turbine section and surrounding shrouds around the blades. The blade out air seal system may include carrier segments that support seal segments that can, under certain operational conditions, contact the tips of the blades. In some designs, a control ring is provided in combination with the carrier segments such that the carrier segments and the control ring together determine the thermal response of the blade outer air seal system to maintain a clearance, at least under some operational conditions.

SUMMARY

A blade outer air seal system for a gas turbine engine according to an exemplary aspect of the present disclosure includes a plurality of ring carriers made of a first material which has a first coefficient of thermal expansion, a plurality of seal segments carried, respectively, on the plurality of ring carriers, and a ring member carried in the plurality of ring carriers. The ring member is made of a second material having a second coefficient of thermal expansion such that the first coefficient of thermal expansion is 75-175% of the second coefficient of thermal expansion.

In a further non-limiting embodiment of any of the foregoing examples, the first coefficient of thermal expansion is less than 150% of the second coefficient of thermal expansion.

In a further non-limiting embodiment of any of the foregoing examples, the first coefficient of thermal expansion is 100-175% of the second coefficient of thermal expansion.

In a further non-limiting embodiment of any of the foregoing examples, the first coefficient of thermal expansion is 115-135% of the second coefficient of thermal expansion.

In a further non-limiting embodiment of any of the foregoing examples, the second material has a density and a heat capacity, and a product of the density and the heat capacity is 0.032 BTU/(in$^3$*° R)±10% (1.145 MJ/m$^3$*K).

In a further non-limiting embodiment of any of the foregoing examples, the plurality of ring carriers defines an internal cavity, and the ring member is carried in the internal cavity.

In a further non-limiting embodiment of any of the foregoing examples, each of the plurality of ring carriers circumscribes a section of the ring member.

In a further non-limiting embodiment of any of the foregoing examples, the first material and the second material are different metallic alloys.

In a further non-limiting embodiment of any of the foregoing examples, each of the different metallic alloys have a density that is greater than 4.5 grams per centimeter cubed.

In a further non-limiting embodiment of any of the foregoing examples, the first coefficient of thermal expansion and the second coefficient of thermal expansion are each greater than 5 parts per million per degree Celsius.

A gas turbine engine according to an exemplary aspect of the present disclosure includes a compressor section, a combustor in fluid communication with the compressor section, and a turbine section in fluid communication with the combustor. The turbine section has a blade outer air seal system including a plurality of ring carriers made of a first material having a first coefficient of thermal expansion, a plurality of seal segments carried on the plurality of ring carriers and a ring member carried in the plurality of ring carriers. The ring member is made of a second material that is different from the first material in composition, the second material having a second coefficient of thermal expansion such that the first coefficient of thermal expansion is 75-175% of the second coefficient of thermal expansion.

In a further non-limiting embodiment of any of the foregoing examples, the first coefficient of thermal expansion is less than 150% of the second coefficient of thermal expansion.

In a further non-limiting embodiment of any of the foregoing examples, the second material has a density and a heat capacity, and a product of the density and the heat capacity is 0.032 BTU/(in$^3$*° R)±10% (1.145 MJ/m$^3$*K).

In a further non-limiting embodiment of any of the foregoing examples, each of the different metallic alloys has a density that is greater than 4.5 grams per centimeter cubed.

In a further non-limiting embodiment of any of the foregoing examples, the first coefficient of thermal expansion and the second coefficient of thermal expansion are each greater than 5 part per million per degree Celsius.

A method for controlling thermal response in a blade outer air seal system for a gas turbine engine includes establishing a thermal response rate of the control ring to be slower than a thermal response rate of the plurality of ring carriers with respect to a surrounding thermal environment by selecting a first coefficient of thermal expansion of the first material in coordination with selecting a second coefficient of thermal expansion the second material such that the first coefficient of thermal expansion is 75-175% of the second coefficient of thermal expansion, and providing the ring member within the plurality of ring carriers such that the plurality of ring carriers shields the ring member from the surrounding thermal environment.

In a further non-limiting embodiment of any of the foregoing examples, the first coefficient of thermal expansion is less than 150% of the second coefficient of thermal expansion.

In a further non-limiting embodiment of any of the foregoing examples, the second material has a density and a heat capacity, and a product of the density and the heat capacity is 0.032 BTU/(in$^3$*° R)±10% (1.145 MJ/m$^3$*K).

In a further non-limiting embodiment of any of the foregoing examples, each of the different metallic alloys has a density that is greater than 4.5 grams per centimeter cubed.

In a further non-limiting embodiment of any of the foregoing examples, the first coefficient of thermal expansion and the second coefficient of thermal expansion are each greater than 5 parts per million per degree Celsius.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
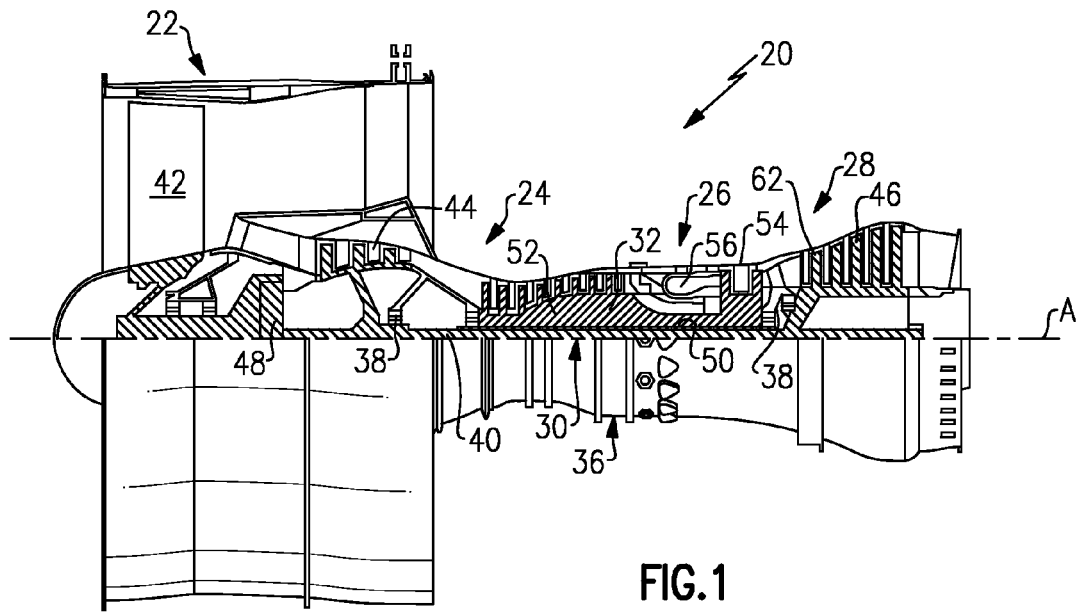
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of $[(Tram ° R)/(518.7° R)]^{0.5}$. The "Low corrected fan tip speed" as disclosed herein according to one non-limiting embodiment is less than about 1150 feet per second.

Figure 2:
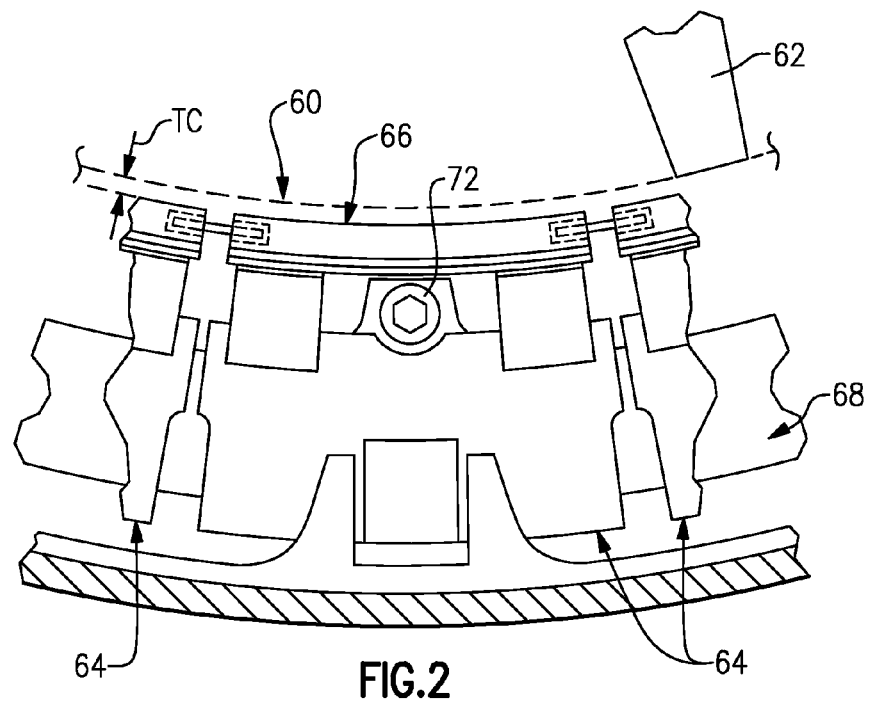
FIG. 2 shows an axial view of a blade outer air seal system.
Figure 3:
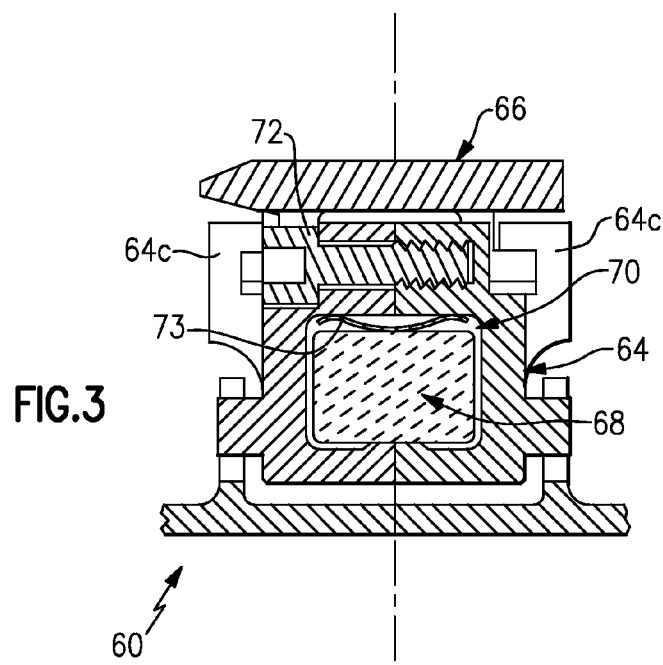
FIG. 3 shows a circumferential view of the blade outer air seal system of FIG. 2.
Figure 4:
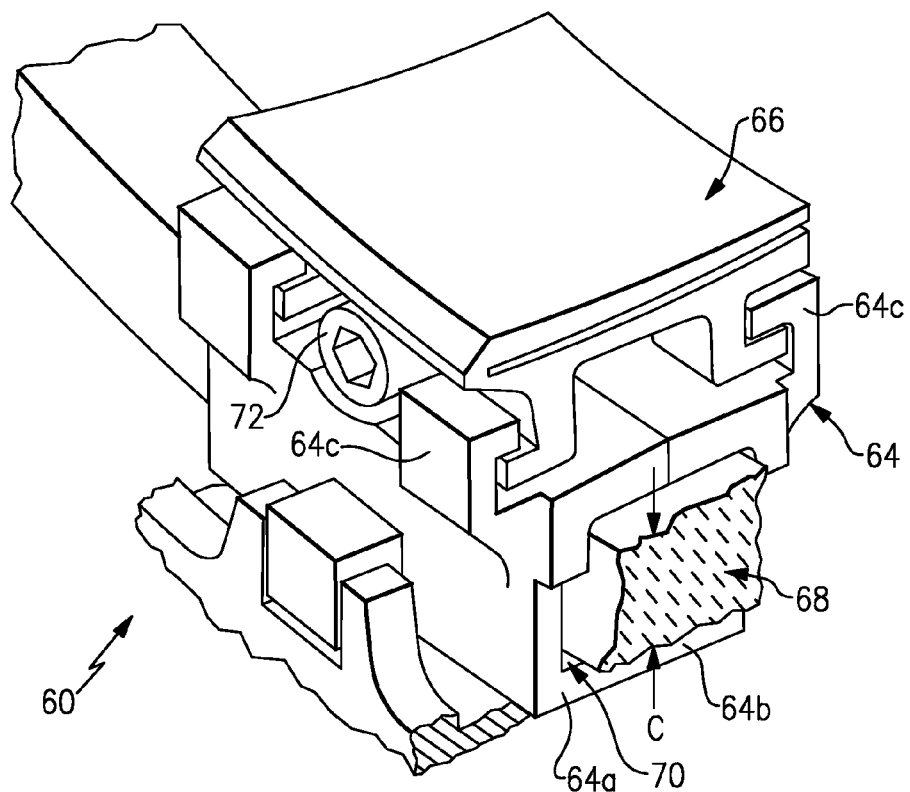
FIG. 4 shows a perspective view of the blade outer air seal system.

Referring to FIGS. 2-4, the engine 20 includes a passive blade outer air seal system 60 (hereafter "system 60") that is operative to passively control a tip clearance TC with turbine blades 62 of the turbine section 28 of the engine 20. In comparison, active tip clearance control systems utilize actuators to move static components according to external control signals and/or modulated external air flow to change the temperature of the static components according to external control signals, to influence a tip clearance. A passive tip clearance control system does not utilize actuators, and/or modulated external air flow, and external control signals and instead relies on internal transient thermal responses, design and geometry of the system components to influence tip clearance.

The system 60 includes a plurality of ring carriers 64 that are circumferentially disposed around the engine central axis A. The ring carriers 64 carry a plurality of seal segments 66. The seal segments 66 provide an outer diameter boundary to the gas flow path through the turbine section 28. A ring member 68 is carried in the ring carriers 64. The ring member 68 can be a continuous ring or can be provided in arcuate segments.

The ring carriers 64 are made of a first material having a first coefficient of thermal expansion ("CTE"). The ring member 68 is made of a second material that is different from the first material of the ring carriers 64 in composition. As will be described in further detail below, the second material of the ring member 68 has a second CTE such that the first CTE of the first material of the ring carriers 64 is 75-175% of the second CTE.

In the illustrated example, each of the ring carriers 64 includes a first section 64*a* and a second section 64*b* that, when joined together, define an internal cavity 70 in which the ring member 68 is carried. The internal cavity 70 is generally larger in cross-section than the cross section C of the ring member 68. Optionally, a spring member 73 can be provided within the internal cavity 70 between the walls of the carrier 64 and the ring member 68 to bias the ring member 68 in a desired direction, such as a radial direction. The sections 64*a*/64*b* of the ring carrier 64 are joined together using a fastener 72. Each of the ring carriers 64 includes hook portions 64*c* for carrying a respective seal segment 66 in a known manner.

The thermal response of a blade outer air seal system under a given operating condition of an engine and a given thermal environment controls the position of the seal segments and thus the tip clearance with the turbine blades. However, under various engine operating conditions, and in particular transient conditions between low engine power, high engine power, and acceleration or deceleration, it is difficult to maintain a tip clearance. For instance, a blade outer air seal system can be designed to provide a desirable tip clearance under some conditions, while in other conditions there may be contact between the tips of the blades and the seal segments or undesirably large clearances. In this regard, the disclosed system 60 provides a bi-modal control structure that can prevent tip contact during both acceleration and deceleration. For example, by selecting the first CTE to be 75-175% of the second CTE, the thermal response of the system 60 can be controlled over a variety of different engine conditions and transient surrounding thermal environments. In further examples, the first CTE is less than 150% of the second CTE. In another example, the first CTE is 100-175% of the second CTE and in another example is 115-135% of the second CTE.

The first material and the second material are selected from different metallic alloys to achieve the noted CTE relationship. For example, the different metallic alloys are independently selected from nickel-, iron- and titanium-based metallic alloys. In a further example, both selected alloys have a density that is greater than 4.5 or 7 grams per centimeter cubed and coefficients of thermal expansion that are greater than 5 parts per million (ppm) per degree Celsius (2.8 ppm/F.°). In one example, the second material is a nickel- or iron-based metallic alloy that has a medium range CTE of 10.8-13.0 ppm/C.° (6-7.2 ppm/F.° and the first material is a nickel- or iron-based metallic alloy with a higher CTE of 13.5-14.4 ppm/° C. (7.5-8 ppm/F.°).

In one example, the first material of the ring carriers 64 is a nickel-based alloy (INCONEL 718) having, by weight percentage, 50-55 nickel and cobalt, 17-21 chromium, 4.75-5.5 niobium and tantalum, 2.8-3.3 molybdenum, 0.65-1.15 titanium, 0.2-0.8 aluminum and a balance of iron. The second material of the ring member 68 is an iron-based alloy (AMS 5616) having, by weight percentage, 12-14 chromium, 0.15-0.2 of carbon, 1.8-2.2 nickel, 2.5-3.5 tungsten, up to 0.5 of each of silicon, manganese and molybdenum, up to 0.03 of each of sulphur and phosphorous, and a balance of iron. In one alternative, the second material of the ring member 68 is a titanium-based alloy and is gamma titanium aluminide.

In one alternative, the second material of the ring member 68 is a nickel-based alloy (HAYNES 242) having, by weight percentage, 24-26 molybdenum, 7-9 chromium, up to 2 iron, up to 2.5 cobalt, up to 0.8 manganese, up to 0.8 silicon, up to 0.5 aluminum, up to 0.03 carbon, up to 0.006 boron, up to 0.5 copper and a balance of nickel.

In another alternative, the second material of the ring member 68 is an iron-based alloy (CONSUMET H-46 Alloy) having, by weight percentage, 0.15-0.20 carbon, 0.50-0.80 manganese, 0.20-0.60 silicon, 10-14 chromium, 0.30-0.60 nickel, 0.50-1 molybdenum, 0.2-0.4 vanadium, 0.2-0.6 niobium and tantalum, 0.04-0.1 nitrogen and a balance of iron.

In another alternative, the second material of the ring member 68 is an iron-based alloy (THERMO-SPAN) having a nominal composition of, by weight percentage, 0.05 carbon, 0.50 manganese, 0.30 silicon, 0.015 phosphorous, 0.015 sulphur, 5.5 chromium, 25 nickel, 29 cobalt, 0.80 titanium, 4.8 niobium, 0.50 aluminum, 0.50 copper, 0.01 boron and a balance of iron. In other examples, like the first material, the second material has a density that is greater than 7 grams per centimeter cubed and the first CTE is greater than 5 ppm/° C. In further examples, the first and second coefficients of thermal expansion are both greater than 7 ppm/° C. or are both greater than 9 ppm/° C.

The thermal response of the blade outer air seal system 60 is also determined, at least in part, by the geometry of the ring carriers 64. Each of the ring carriers 64 circumscribes a section of the ring member 68, as seen in FIG. 4. The ring carriers 64 thus serve as a thermal shield between the surrounding thermal environment, including heat from the seal segments 66, to slow the thermal response rate of the ring member 68. Thus, the given coefficients of thermal expansion in combination with the shielding of the ring carriers 64 can be used to tailor the thermal response of the system 60 for a particular engine design, operating conditions and transient conditions.

Additionally, since the ring member 68 is made of a relatively high density material such as the nickel- or iron-based alloy, the ring member 68 has a relatively high thermal mass. The thermal mass is represented herein as a product of the density and the heat capacity of the second material. In one example, the product is 0.032 BTU/(in$^3$*° R)±10% (1.145 MJ/m$^3$*K). A high thermal mass has a relatively slow thermal response while a relatively lower thermal mass would have a relatively faster thermal response.

In combination with the shielding provided by the ring carriers 64, the relatively high thermal mass of the ring member 68 slows the thermal response of the ring member 68. Accordingly, in operation, the ring carriers 64 thermally respond to a change in the surrounding thermal environment at a faster rate than the ring member 68. This difference in thermal response can be used to further tailor the overall thermal response of the system 60 such that a desirable tip clearance TC is provided under various different thermal conditions, such thermal transient conditions from acceleration and deceleration.

Further, the thermal response of the ring member 68, which can have a mass of approximately 20 mass pounds (9.1 kilograms), can be slower than the thermal response of the turbine disk, which can have a mass of approximately 200-300 mass pounds (90.7-136.1 kilograms), thus resulting in the reduction or elimination of transient rub. Actual mass of a ring member made of a lower density material could be increased to achieve a similar effect, however, the corresponding increase in the size of the ring member would not be practical with respect to engine packaging. Similarly, heat transfer through a blade outer air seal system can be designed to reduce convective heat transfer to a ring member, however, flow leakages, part-to-part gaps, tolerances and other variations make a reduction to the tip clearance levels provided by the disclosed system 60 impractical. The system 60 thus also provides a compact and relatively uncomplicated solution to controlling and maintaining tip clearance.

Figure 5:
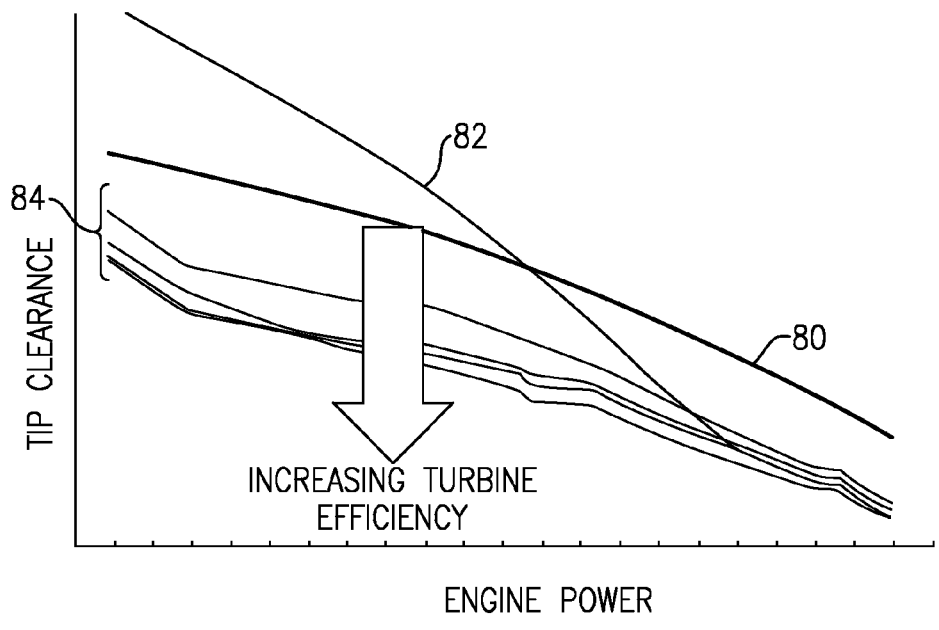
FIG. 5 shows a graph of tip clearance versus engine power.

FIG. 5 shows an example of tip clearance versus engine power for various blade outer air seal systems. A baseline one-piece control ring system is represented by line 80, a metallic carrier and non-metallic ring system is represented at line 82, and the group of lines designated at 84 represent the disclosed system 60 with different materials used for the ring member 68. As shown, the metallic carrier and non-metallic ring system at line 82 has a steep incline and thus produces a pinch point where the blade tips will contact the seal members. In comparison, the lines represented at 84 for the disclosed system 60 maintain a low tip clearance at low and high engine power. For example, a steady state tip clearance reduction of 20-50% over the baseline can be obtained from idle to full power, without a pinch point.

Figure 6:
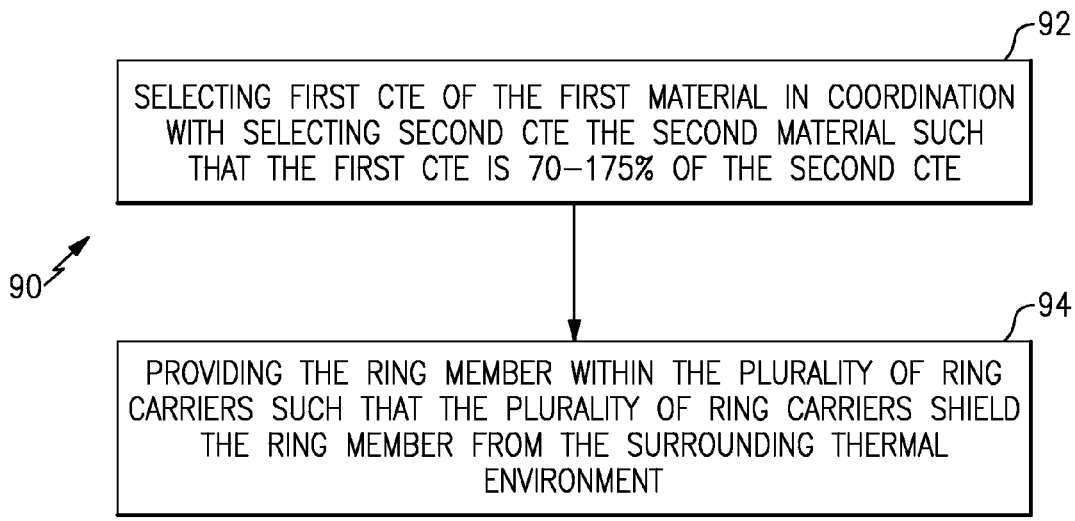
FIG. 6 shows a method for controlling thermal response in a blade outer air seal system for a gas turbine engine.

FIG. 6 shows an example method 90 for controlling thermal response in a blade outer air seal system, such as system 60. In this example, the method 90 includes step 92 and step 94. Step 92 includes selecting the first CTE of the first material in coordination with selecting the second CTE of the second material such that the first CTE is 75-175% of the second CTE. Step 94 includes providing the ring member 68 in the ring carriers 64 such that the ring carriers 64 shield the ring member 68 from the surrounding thermal environment. By controlling the coefficients of thermal expansion of the first and second materials in combination with shielding the ring member 68 from the surrounding thermal environment using the ring carriers 64, a bi-modal or multi-modal thermal response of the system 60 can be provided to enhance control over the tip clearance TC with the blades 60.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A blade outer air seal system for a gas turbine engine, comprising:
a plurality of ring carriers made of a first material having a first coefficient of thermal expansion;
a plurality of seal segments carried, respectively, on the plurality of ring carriers;
a ring member carried in the plurality of ring carriers, the ring member being made of a second material having a second coefficient of thermal expansion such that the first coefficient of thermal expansion is 75-175% of the second coefficient of thermal expansion, wherein the first material and the second material are different metallic alloys, and the first coefficient of thermal expansion and the second coefficient of thermal expansion are both above 5 part per million per degree Celsius.

2. The blade outer air seal system as recited in claim 1, wherein the first coefficient of thermal expansion is less than 150% of the second coefficient of thermal expansion.

3. The blade outer air seal system as recited in claim 1, wherein the first coefficient of thermal expansion is 100-175% of the second coefficient of thermal expansion.

4. The blade outer air seal system as recited in claim 1, wherein the first coefficient of thermal expansion is 115-135% of the second coefficient of thermal expansion.

5. The blade outer air seal system as recited in claim 1, wherein the second material has a density and a heat capacity, and a product of the density and the heat capacity is 0.032 BTU/(in$^3$*° R)±10% (1.145 MJ/m$^3$*K).

6. The blade outer air seal system as recited in claim 1, wherein the plurality of ring carriers define an internal cavity, and the ring member is carried in the internal cavity.

7. The blade outer air seal system as recited in claim 1, wherein each of the plurality of ring carriers circumscribes a section of the ring member.

8. The blade outer air seal system as recited in claim 1, wherein the second material is an iron-based alloy.

9. The blade outer air seal system as recited in claim 1, wherein a plot of blade tip clearance versus engine power for the plurality of ring carriers and the ring member exhibits a lower incline in comparison to a plot of blade tip clearance versus engine power for a baseline metallic carrier and a baseline non-metallic ring.

10. A gas turbine engine comprising:
a compressor section;
a combustor in fluid communication with the compressor section; and
a turbine section in fluid communication with the combustor, the turbine section having a blade outer air seal system including a plurality of ring carriers made of a first material having a first coefficient of thermal expansion, a plurality of seal segments carried on the plurality of ring carriers and a ring member carried in the plurality of ring carriers, the ring member being made of a second material that is different from the first material in composition, the second material having a second coefficient of thermal expansion such that the first coefficient of thermal expansion is 75-175% of the second coefficient of thermal expansion, wherein the first material and the second material are different metallic alloys, and the first coefficient of thermal expansion and the second coefficient of thermal expansion are both above 5 part per million per degree Celsius.

11. The gas turbine engine as recited in claim 10, wherein the first coefficient of thermal expansion is less than 150% of the second coefficient of thermal expansion.

12. The gas turbine engine as recited in claim 10, wherein the second material has a density and a heat capacity, and a product of the density and the heat capacity is 0.032 BTU/(in$^3$*° R)±10% (1.145 MJ/m$^3$*K).

13. The gas turbine engine as recited in claim 10, wherein the second material is an iron-based alloy.

14. The gas turbine engine as recited in claim 10, wherein a plot of blade tip clearance versus engine power for the plurality of ring carriers and the ring member exhibits a lower incline in comparison to a plot of blade tip clearance versus engine power for a baseline metallic carrier and a baseline non-metallic ring.

15. The gas turbine engine as recited in claim 10, further comprising a fan section coupled to be driven by the turbine section, the turbine section having a first turbine and a second turbine, the first turbine having a maximum rotor diameter and the fan section having a fan diameter such that a ratio of the maximum rotor diameter divided by the fan diameter is less than 0.6.

16. A method for controlling thermal response in a blade outer air seal system for a gas turbine engine, the method comprising:
  in a blade outer air seal system that includes a plurality of ring carriers made of a first material, a plurality of seal segments carried on the plurality of ring carriers and a ring member carried in the plurality of ring carriers and made of a second material that is different from the first material in composition,
  establishing a thermal response rate of the control ring to be slower than a thermal response rate of the plurality of ring carriers with respect to a surrounding thermal environment by:
    (a) selecting a first coefficient of thermal expansion of the first material in coordination with selecting a second coefficient of thermal expansion the second material such that the first coefficient of thermal expansion is 75-175% of the second coefficient of thermal expansion, and
    (b) providing the ring member within the plurality of ring carriers such that the plurality of ring carriers shields the ring member from the surrounding thermal environment, wherein the first material and the second material are different metallic alloys, and the first coefficient of thermal expansion and the second coefficient of thermal expansion are both above 5 part per million per degree Celsius.

17. The method as recited in claim 16, wherein the first coefficient of thermal expansion is less than 150% of the second coefficient of thermal expansion.

18. The method as recited in claim 16, wherein the second material has a density and a heat capacity, and a product of the density and the heat capacity is 0.032 BTU/(in$^3$*° R)±10% (1.145 MJ/m$^3$*K).

19. The method as recited in claim 16, wherein the second material is an iron-based alloy.

20. The method as recited in claim 16, wherein a plot of blade tip clearance versus engine power for the plurality of ring carriers and the ring member exhibits a lower incline in comparison to a plot of blade tip clearance versus engine power for a baseline metallic carrier and a baseline non-metallic ring.

* * * * *

UNITED STATES PATENT AND TRADEMARK OFFICE
CERTIFICATE OF CORRECTION

PATENT NO. : 9,447,696 B2  Page 1 of 1
APPLICATION NO. : 13/727798
DATED : September 20, 2016
INVENTOR(S) : Michael G. McCaffrey It is certified that error appears in the above-identified patent and that said Letters Patent is hereby corrected as shown below:

In the Claims

In Claim 16, Column 10, Line 1; after "expansion" insert --of--

Signed and Sealed this
Seventh Day of March, 2017

Michelle K. Lee
*Director of the United States Patent and Trademark Office*